(12) United States Patent
Akamatsu et al.

(10) Patent No.: US 11,313,468 B2
(45) Date of Patent: Apr. 26, 2022

(54) SEALING METHOD, ASSEMBLY, AND ASSEMBLY MANUFACTURING METHOD

(71) Applicant: MITSUBISHI HEAVY INDUSTRIES, LTD., Tokyo (JP)

(72) Inventors: Hiroki Akamatsu, Tokyo (JP); Koichi Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 336 days.

(21) Appl. No.: 16/635,415

(22) PCT Filed: Jul. 24, 2018

(86) PCT No.: PCT/JP2018/027678
§ 371 (c)(1),
(2) Date: Jan. 30, 2020

(87) PCT Pub. No.: WO2019/092932
PCT Pub. Date: May 16, 2019

(65) Prior Publication Data
US 2020/0370650 A1    Nov. 26, 2020

(30) Foreign Application Priority Data
Nov. 9, 2017  (JP) .............................. JP2017-216508

(51) Int. Cl.
*B32B 3/08* (2006.01)
*F16J 15/14* (2006.01)
(Continued)

(52) U.S. Cl.
CPC ................ *F16J 15/14* (2013.01); *B32B 3/08* (2013.01); *B32B 5/02* (2013.01); *B32B 37/0076* (2013.01);
(Continued)

(58) Field of Classification Search
CPC ......... B32B 3/08; B32B 7/12; B32B 37/1284; B32B 2255/02; B32B 2260/021;
(Continued)

(56) References Cited

U.S. PATENT DOCUMENTS

2015/0217326 A1* 8/2015 Nawata .................. B29C 48/06
425/461

FOREIGN PATENT DOCUMENTS

JP    2016-114182 A    6/2016
JP    2016-518271 A    6/2016

OTHER PUBLICATIONS

PCT/ISA/210, "International Search Report for International Application No. PCT/JP2018/027678," dated Sep. 18, 2018.
(Continued)

*Primary Examiner* — Elizabeth E Mulvaney
(74) *Attorney, Agent, or Firm* — Manabu Kanesaka; Benjamin Hauptman; Kenneth Berner

(57) ABSTRACT

The sealing method is for sealing between: a rear surface of a first component which is a composite material containing a reinforcing fiber and a resin; and a front surface of a second component facing the rear surface of the first component. The sealing method includes: a step (ST03) in which a molded body is placed at a corner between the front surface and an end surface of the first component, with a first sealing material interposed therebetween; and a step (ST06) in which a second sealing material is applied from the molded body up to the front surface of the second component.

10 Claims, 10 Drawing Sheets

(51) Int. Cl.
| | |
|---|---|
| *F16J 15/06* | (2006.01) |
| *B32B 5/02* | (2006.01) |
| *B32B 37/00* | (2006.01) |
| *B32B 37/12* | (2006.01) |
| *F16J 15/10* | (2006.01) |

(52) U.S. Cl.
CPC .......... *B32B 37/12* (2013.01); *B32B 37/1284* (2013.01); *F16J 15/062* (2013.01); *B32B 2255/02* (2013.01); *B32B 2260/021* (2013.01); *B32B 2260/046* (2013.01); *B32B 2305/08* (2013.01); *F16J 15/061* (2013.01); *F16J 15/102* (2013.01)

(58) Field of Classification Search
CPC ........ B32B 2605/18; F16J 15/02; F16J 15/14; F16J 15/102
See application file for complete search history.

(56) References Cited

OTHER PUBLICATIONS

PCT/ISA/237, "Written Opinion of the International Searching Authority for International Application No. PCT/JP2018/027678," dated Sep. 18, 2018.

\* cited by examiner

SEALING METHOD, ASSEMBLY, AND ASSEMBLY MANUFACTURING METHOD

TECHNICAL FIELD

The invention relates to a sealing method, an assembly, and a manufacturing method for an assembly.

This application claims priority to Japanese Patent Application No. 2017-216508, filed in Japan on Nov. 9, 2017, the contents of which are incorporated herein by reference.

BACKGROUND ART

A method of performing sealing by providing a sealing material at a bonding portion between two components for improving a sealing performance between the two components is known.

For example, PTL 1 discloses a method of sealing a portion between a structure and a pipe by providing a sealing material between an inner surface of a through-hole of the structure and an outer circumferential surface of the pipe which is inserted into the through-hole.

CITATION LIST

Patent Literature

[PTL 1] Japanese Unexamined Patent Application Publication No. 2016-114182

SUMMARY OF INVENTION

Technical Problem

In some cases, in a composite material containing a reinforcing fiber and a resin, it is necessary not only to seal a portion between the composite material and another component, but also to seal the end surface of the composite material itself.

In the sealing method disclosed in PTL 1, since the sealing material is provided only between the two components, it is necessary to provide a separate sealing material to the end surface of the composite material in order to seal the end surface of the composite material. Accordingly, a step of sealing formation becomes complicated.

The invention provides a sealing method, an assembly, and a manufacturing method for an assembly, in which sealing formation in a composite material is simple.

Solution to Problem

A sealing method according to a first aspect is for sealing a portion between a rear surface of a first component which is a composite material containing a reinforcing fiber and a resin, and a front surface of a second component facing the rear surface of the first component, and the sealing method includes a step of placing a molded body at a corner between a front surface and an end surface of the first component, via a first sealing material; and a step of applying a second sealing material from the molded body up to the front surface of the second component.

In this aspect, the molded body is placed at the corner between the front surface and the end surface of the first component, and the second sealing material is applied from the molded body up to the front surface of the second component. Therefore, the composite material is sealed from the end surface of the composite material up to a portion between the composite material and another component. Accordingly, in the sealing method, sealing formation in the composite material is simple.

A sealing method according to a second aspect is for sealing a portion between a rear surface of a first component which is a composite material containing a reinforcing fiber and a resin, and a front surface of a second component facing the rear surface of the first component, and the sealing method includes a step of placing a molded body from a corner between a front surface and an end surface of the first component up to the front surface of the second component, via a first sealing material.

In this aspect, the molded body is placed from the corner between the front surface and the end surface of the first component up to the front surface of the second component. Therefore, the composite material is sealed from the end surface of the composite material up to a portion between the composite material and another component. Accordingly, in the sealing method, sealing formation in the composite material is simple.

A sealing method according to a third aspect is the sealing method according to the first or second aspect in which the molded body is a precured material.

A sealing method according to a fourth aspect is the sealing method according to any one of the first to third aspects, further including a step of applying the first sealing material to the molded body before the step of placing the molded body.

A sealing method according to a fifth aspect is the sealing method according to any one of the first to fourth aspects, further including a step of checking the first sealing material which protrudes from a periphery of the molded body, following the step of placing the molded body.

A sealing method according to a sixth aspect is the sealing method according to any one of the first to fifth aspects, further including a step of shaping the first sealing material which protrudes from a periphery of the molded body, following the step of placing the molded body.

A sealing method according to a seventh aspect is the sealing method according to the first aspect further including a step of shaping the second sealing material, following the step of placing the molded body.

A sealing method according to an eighth aspect is the sealing method according to the seventh aspect, in which the step of shaping the second sealing material is a step of performing shaping by causing a shaping tool to abut on the molded body, and shapes of abutting surfaces of the molded body and the shaping tool are matched to each other.

An assembly according to a ninth aspect includes a first component which is a composite material containing a reinforcing fiber and a resin; a second component of which a front surface is disposed to face a rear surface of the first component; a molded body which is placed at a corner between a front surface and an end surface of the first component, via a first sealing material; and a second sealing material applied from the molded body up to the front surface of the second component.

In this aspect, the molded body is placed at the corner between the front surface and the end surface of the first component, and the second sealing material is applied from the molded body up to the front surface of the second component. Therefore, the composite material is sealed from the end surface of the composite material up to a portion between the composite material and another component. Accordingly, in the assembly, sealing formation in the composite material is simple.

A manufacturing method for an assembly according to a tenth aspect is a manufacturing method of an assembly in which a portion between a rear surface of a first component which is a composite material containing a reinforcing fiber and a resin and a rear surface of a second component facing the rear surface of the first component is sealed, and the manufacturing method includes a step of placing a molded body at a corner between a front surface and an end surface of the first component, via a first sealing material; and a step of applying a second sealing material from the molded body up to the front surface of the second component.

In this aspect, the molded body is placed at the corner between the front surface and the end surface of the first component, and the second sealing material is applied from the molded body up to the front surface of the second component. Therefore, the composite material is sealed from the end surface of the composite material up to a portion between the composite material and another component. Accordingly, in the manufacturing method for an assembly, sealing formation in the composite material is simple.

Advantageous Effects of Invention

According to an aspect of the invention, sealing formation in a composite material is simple.

DESCRIPTION OF EMBODIMENTS

Hereinafter, a sealing method of embodiments according to the invention will be described with reference to drawings.

First Embodiment

Hereinafter, a sealing method according to a first embodiment will be described with reference to FIGS. 1 to 12.

The sealing method of this embodiment is applied to a first component 10 as a composite member containing a reinforcing fiber and a resin.

The sealing method of this embodiment is to seal a portion between a rear surface 10*b* of the first component 10 and a front surface 20*a* of a second component 20, which faces the rear surface 10*b* of the first component 10.

Figure 1:
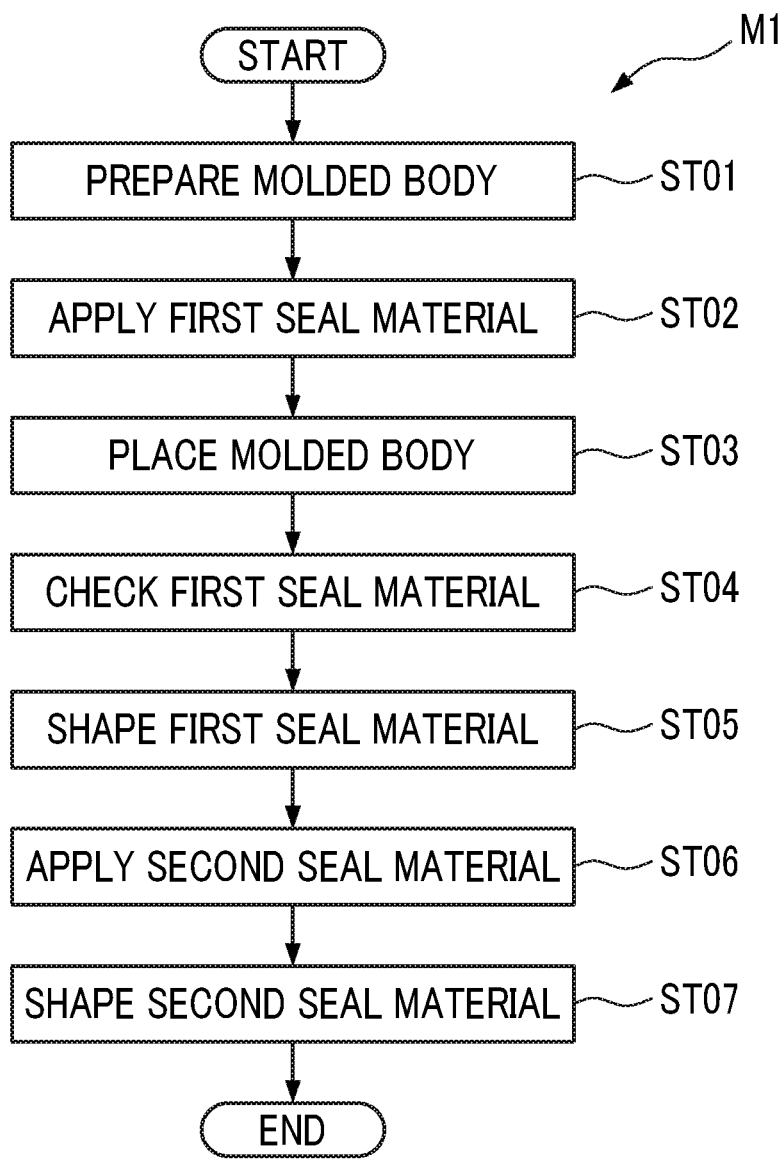
FIG. 1 is a flowchart of a sealing method in a first embodiment according to the invention.

As illustrated in FIG. 1, a sealing method M1 includes a step (ST01) of preparing a molded body 30, a step (ST02) of applying a first sealing material 40 to the molded body 30, a step (ST03) of placing the molded body 30, a step (ST04) of checking the first sealing material 40, a step (ST05) of shaping the first sealing material 40, a step (ST06) of applying a second sealing material 50, and a step (ST07) of shaping the second sealing material 50.

In this embodiment, the first sealing material 40 and the second sealing material 50 are formed of the same material. The material of the first sealing material 40 and the second sealing material 50 used as a sealant may be a polysulfide (polysulfide)-based material or a silicon-based material.

Figure 2:
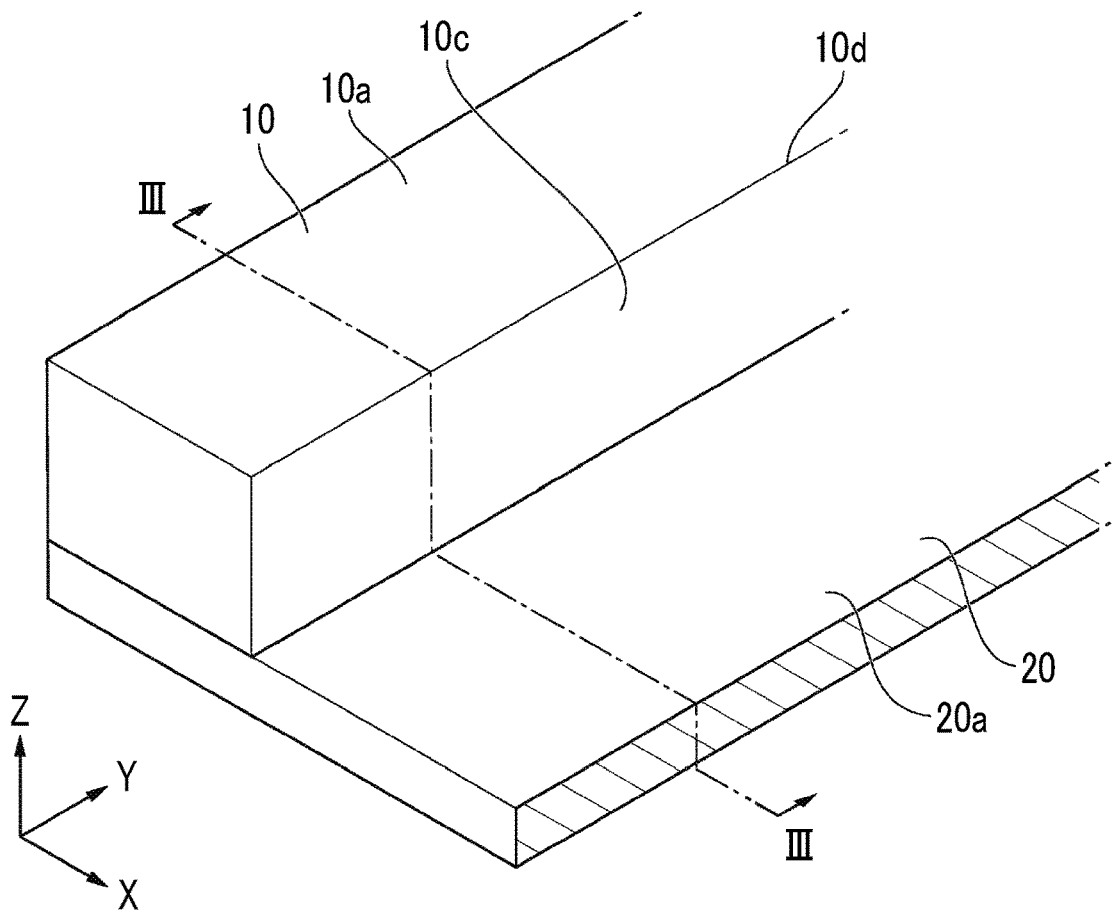
FIG. 2 is a perspective view illustrating a first component and a second component used in the sealing method in the first embodiment according to the invention.
Figure 3:
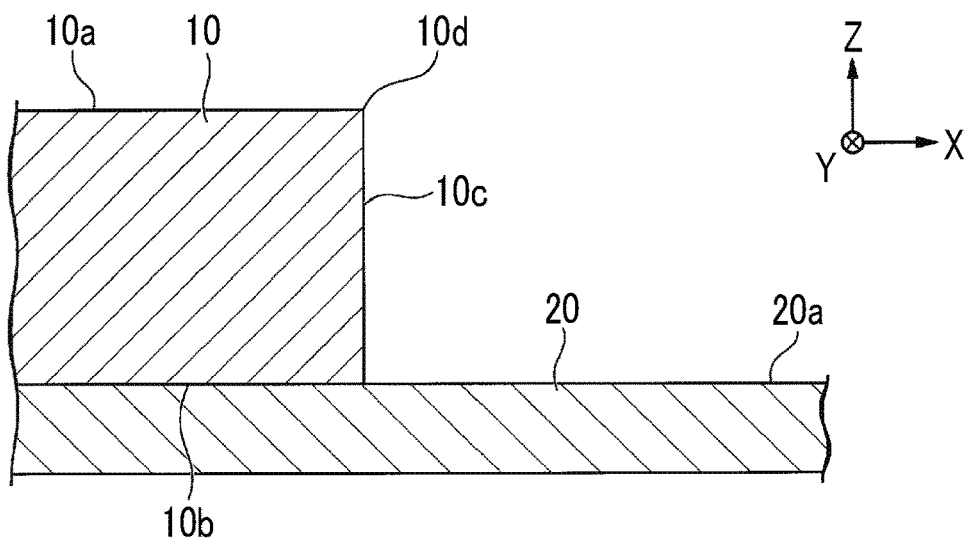
FIG. 3 is a sectional view taken along line III-III in FIG. 2.

In this embodiment, the first component 10 and the second component 20 as illustrated in FIGS. 2 and 3 are sealed including an end surface 10*c* of the first component 10.

As illustrated in FIGS. 2 and 3, each of the first component 10 and the second component 20 is a plate having a plate surface along an XY plane. The reinforcing fiber of the first component 10 is oriented in substantially the XY plane. In this embodiment, the first component 10 is cured carbon fiber reinforced plastic (CFRP) in which carbon fiber is used as the reinforcing fiber.

The end surface 10*c* of the first component 10 is a surface along a YZ plane, and is an end surface formed between a front surface 10*a* and the rear surface 10*b* of the first component 10. Since the end surface 10*c* of the first component 10 is a surface along the YZ plane, the end surface 10*c* intersects with the orientation of the reinforcing fiber.

The first component 10 is superimposed on the second component 20 such that the end surface 10*c* of the first component 10 is positioned on the front surface 20*a* of the second component 20. The first component 10 is superimposed on the second component 20 such that the rear surface 10*b* of the first component 10 faces the front surface 20*a* of the second component 20.

Step of Preparing Molded Body

First, ST01 is performed. In ST01, an operator prepares the molded body 30 according to the shape of a corner 10d between the front surface 10a and the end surface 10c of the first component 10.

Figure 4:
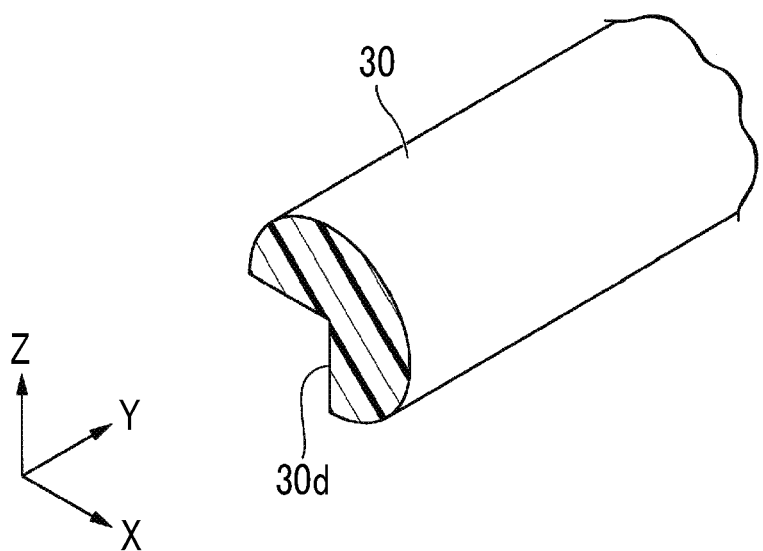
FIG. 4 is a perspective view illustrating a molded body prepared in the first embodiment according to the invention.

As illustrated in FIG. 4, the molded body 30 has a shape in which a notch 30d is notched from a cylinder extending in a Y direction. The notch 30d has a notched shape along the corner 10d extending in the Y direction. In this embodiment, the molded body 30 has a fan shape in a ZX section.

In this embodiment, the molded body 30 is formed of a substance (precured material) obtained by curing a material used for the first sealing material 40 or the second sealing material 50. The shape of the molded body 30 may be shaped before curing or may be shaped after curing.

Hereinafter, among an X direction, the Y direction, and a Z direction in the drawings, arrow directions are indicated as a +X direction, a +Y direction, and a +Z direction, respectively. Inversely, among the X direction, the Y direction, and the Z direction in the drawings, directions apposite to the arrow directions are indicated as a −X direction, a −Y direction, and a −Z direction, respectively.

Step of Applying First Sealing Material to Molded Body

Figure 5:
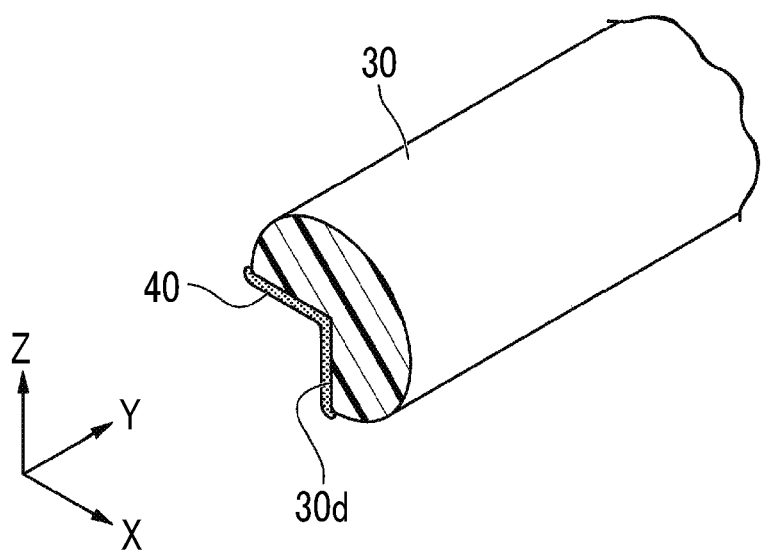
FIG. 5 is a perspective view illustrating the molded body to which a first sealing material is applied in the first embodiment according to the invention.

Following ST01, ST02 is performed. In ST02, the operator applies the first sealing material 40 to at least a part of the notch 30d of the molded body 30 as illustrated in FIG. 5. In this embodiment, the first sealing material 40 is applied to the notch 30d of the molded body 30 so as to extend in the Y direction.

In a case where it is not necessary to apply the first sealing material 40 to the prepared molded body 30, ST02 may not be necessarily performed.

Step of Placing Molded Body

Figure 6:
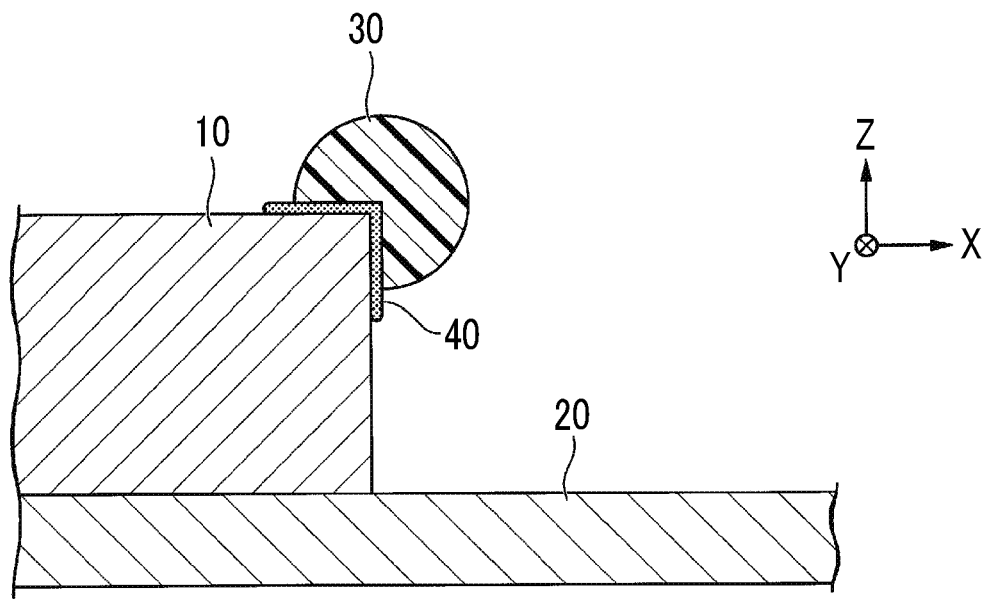
FIG. 6 is a view illustrating a step of placing the molded body in the first embodiment according to the invention.

Following ST02, ST03 is performed. In ST03, the operator places the molded body 30 on the corner 10d of the first component 10 as illustrated in FIG. 6. In ST02, the first sealing material 40 is applied slightly more to an extent that the first sealing material 40 protrudes from the periphery of the molded body 30 at the time of placing the molded body 30. Therefore, in ST03, at the time of placing the molded body 30 on the corner 10d of the first component 10, when the first sealing material 40 is uniformly spread between the molded body 30 and the first component 10, the excessive amount of the first sealing material 40 protrudes toward the front surface 10a and the end surface 10c of the first component 10.

Step of Checking First Seal

Following ST03, ST04 is performed. In ST04, the operator checks the first sealing material 40 protruding from the periphery of the molded body 30. In this embodiment, the operator checks that the first sealing material 40 protrudes from the periphery of the molded body 30 toward the front surface 10a and the end surface 10c of the first component 10.

If the first sealing material 40 is uniformly spread between the molded body 30 and the first component 10, since the excessive amount of the first sealing material 40 protrudes toward the front surface 10a and the end surface 10c of the first component 10, it is possible to check the placing state of the molded body 30. Here, it is possible to check that the first sealing material 40 is uniformly spread between the molded body 30 and the first component 10.

In a case where it is not necessary to check the first sealing material 40, ST03 may not be necessarily performed.

Step of Shaping First Seal

Figure 7:
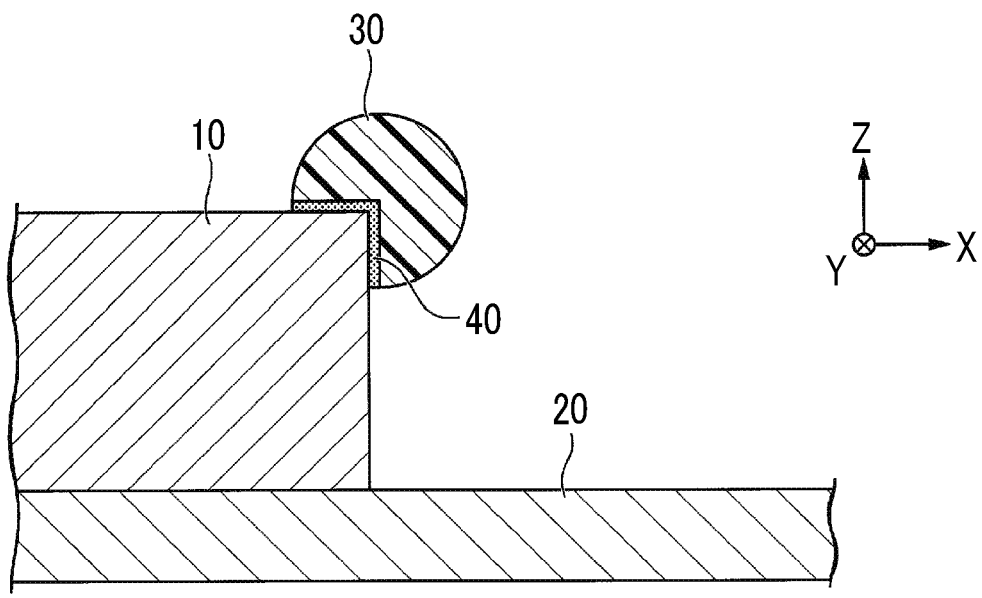
FIG. 7 is a view illustrating a step of shaping the first sealing material in the first embodiment according to the invention.

Following ST04, ST05 is performed. In ST05, the operator shapes the first sealing material 40 protruding from the periphery of the molded body 30 as illustrated in FIG. 7. In this embodiment, the operator removes the first sealing material 40 protruding from the periphery of the molded body 30 toward the front surface 10a and the end surface 10c of the first component 10. The protruding first sealing material 40 may be wiped off before the first sealing material 40 is cured, or the protruding first sealing material 40 may be cut off after the first sealing material 40 is cured.

The protruding first sealing material 40 may be removed as much as possible, and may not be completely removed.

Further, in a case where the protruding first sealing material 40 is less so as not to be necessarily shaped, ST05 may not be necessarily performed.

Step of Applying Second Sealing Material

Figure 8:
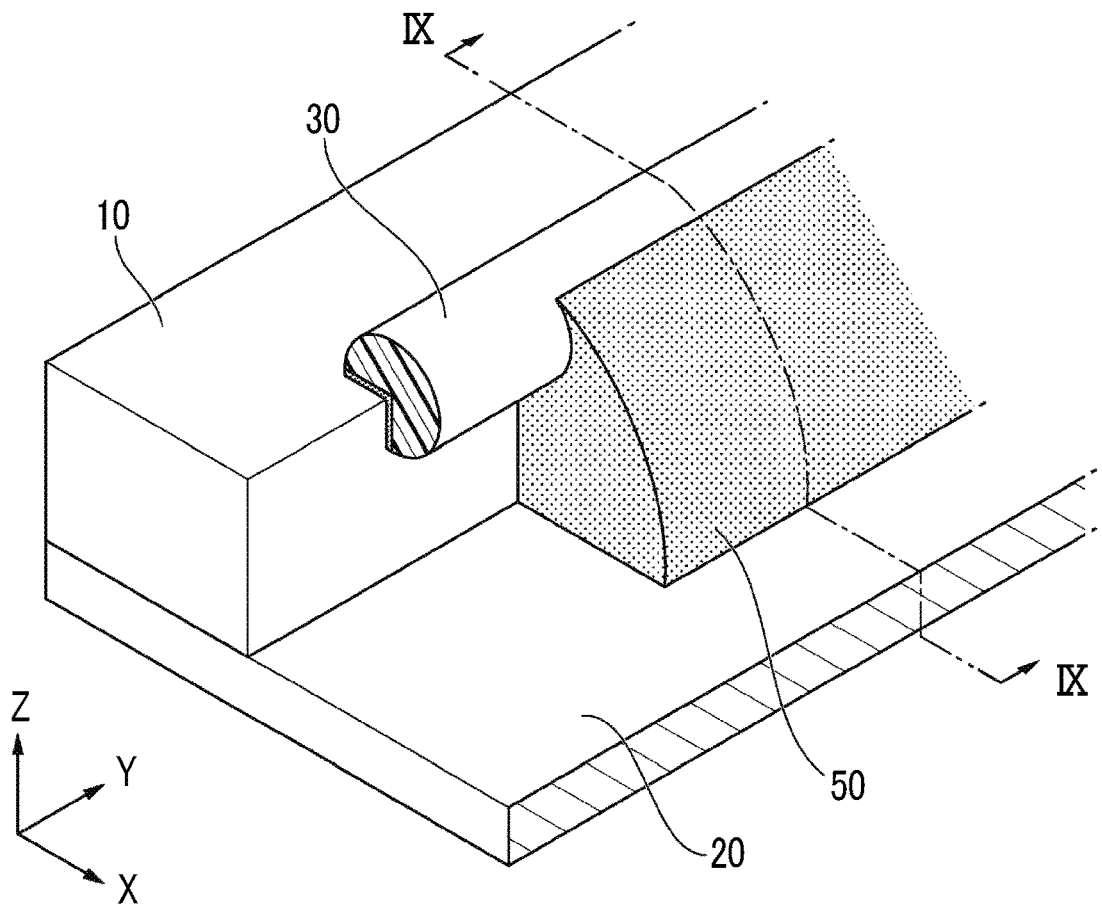
FIG. 8 is a perspective view illustrating the first component and the second component to which a second sealing material is applied in the first embodiment according to the invention.
Figure 9:
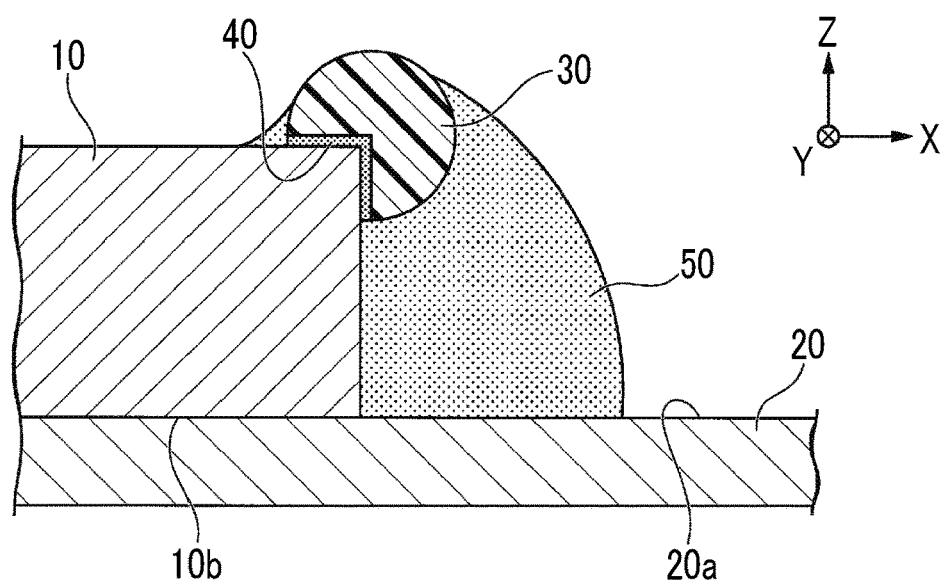
FIG. 9 is a sectional view taken along line IX-IX in FIG. 8.

Following ST05, ST06 is performed. In ST06, the operator applies the second sealing material 50 from the molded body 30 up to the front surface 10a of the first component 10 and the front surface 20a of the second component 20 as illustrated in FIGS. 8 and 9. In this embodiment, the operator applies the second sealing material 50 in an Y-axis direction.

In this manner, the end surface 10c of the first component 10 is sealed. Further, a portion between the rear surface 10b of the first component 10 and the front surface 20a of the second component 20 is sealed.

The second sealing material 50 is applied in a large amount so as to seal each portion.

In this embodiment, the second sealing material 50 is applied on both sides of the molded body 30 in the X direction as illustrated in FIG. 9, but the second sealing material 50 may be applied only on the +X direction side (right side in FIG. 9) of the molded body 30 and the second sealing material 50 may not be applied on the −X direction side (left side in FIG. 9) of the molded body 30.

For easy understanding of the drawing, FIG. 8 illustrates that a part of the second sealing material 50 and the molded body 30 is peeled off.

Step of Shaping Second Sealing Material

Figure 10:
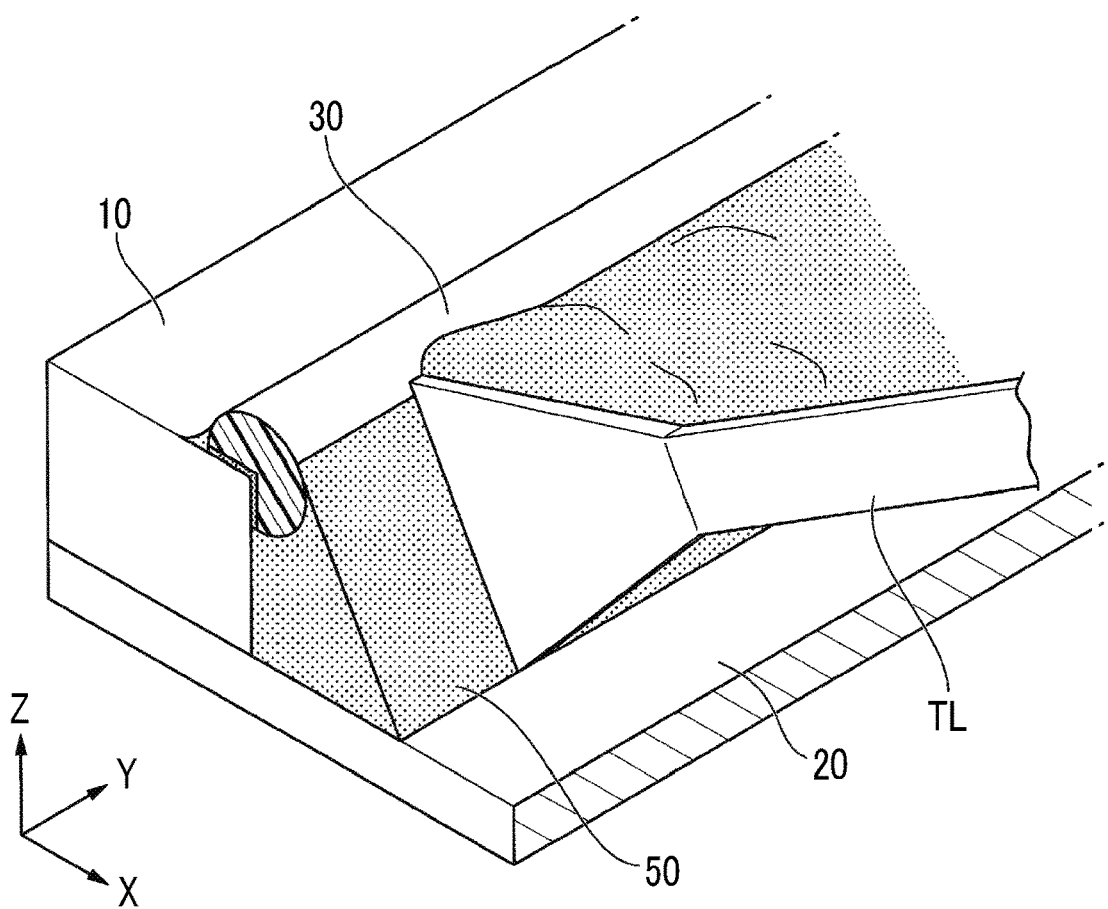
FIG. 10 is a perspective view illustrating the first component and the second component during a step of shaping the second sealing material in the first embodiment according to the invention.
Figure 11:
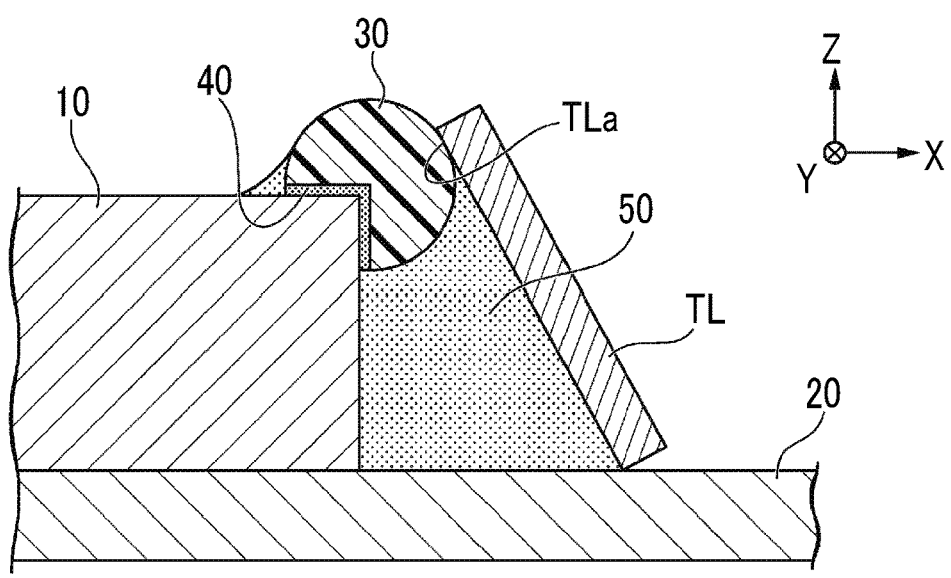
FIG. 11 is a view illustrating a step of shaping the second sealing material in the first embodiment according to the invention.

Following ST06, ST07 is performed. In ST06, the operator shapes the second sealing material 50 as illustrated in FIGS. 10 and 11. In this embodiment, the operator shapes the second sealing material 50 using a shaping tool TL having a flat surface as a shaping section TLa at the tip. The operator slides the shaping tool TL against the second sealing material 50 in the Y direction while causing the shaping section TLa to abut on the molded body 30 and the front surface 20a of the second component 20 so as to wipe off the applied second sealing material 50. By shaping in this manner, the second sealing material 50 has a hem-spread shape (fillet shape) from the molded body 30 toward the front surface 20a of the second component 20 after curing.

In a case where the shape of the second sealing material 50 is arranged in ST06 so that the second sealing material 50 is not necessarily shaped, ST07 may not be necessarily performed.

Figure 12:
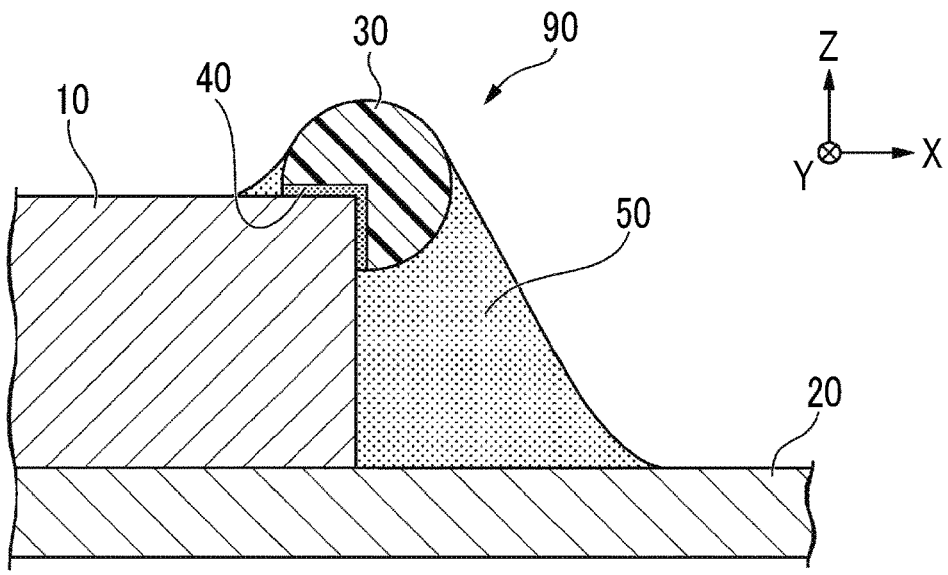
FIG. 12 is a sectional view in an XZ plane of an assembly in the first embodiment according to the invention.

By the above-described steps, it is possible to obtain an assembly 90 having the first component 10, the second component 20, the molded body 30 which is placed at the corner 10d via the first sealing material 40, and the second sealing material which is applied from the molded body 30 up to the front surface 10a of the first component 10 and the front surface 20a of the second component 20, as illustrated in FIG. 12.

For easy understanding of the drawing, the first component 10 is cut on the way from the position of the end surface 10c toward the −X direction in FIGS. 2, 8, and 10, but actually, the first component 10 extends from the position of the end surface 10c toward the −X direction.

Similarly, for easy understanding of the drawing, the second component 20 is cut on the way from the position of the end surface 10c toward the −X direction and the +X direction in FIGS. 2, 8, and 10, but actually, the second component 20 extends from the position of the end surface 10c toward the −X direction and the +X direction.

Action and Effect

In the sealing method of this embodiment, the molded body 30 is placed at the corner 10d of the first component 10, and the second sealing material 50 is applied from the molded body 30 up to the front surface 20a of the second component 20. In this manner, it is possible to seal the end surface 10c of the first component 10, and to seal a portion between the first component 10 and the second component 20. Accordingly, sealing formation in the composite material is simple.

In the sealing method of this embodiment, since the corner 10d of the first component 10 is sealed by applying the molded body 30, sealing molding on an upper portion of the end surface 10c becomes easy.

In the sealing method of this embodiment, the second sealing material 50 is applied between the second component and the molded body 30 with its shape maintained. Therefore, as at least the molded body 30 is formed, it is possible to reduce time for sealing molding and to suppress quality degradation due to mixing of bubbles. Further, since the shape of the second sealing material 50 is a shape guided by the molded body 30, it is possible to keep the dimension of sealing including the molded body 30 constant.

In the sealing method of this embodiment, the second sealing material 50 is shaped by causing the shaping section TLa of the shaping tool TL to abut on the molded body 30 and the front surface 20a of the second component 20. Therefore, the shaping tool TL is guided by the molded body 30. Accordingly, it is possible to keep the shape of sealing including the molded body 30 constant.

In order to shape the fillet shape climbing over the corner 10d with only the sealing material by applying the sealing material using a spatula, sealing with a large volume is required. Therefore, in order to shape the fillet shape by causing the sealing material to be along the first component and the second component, a complicated spatula stroke is required. Further, the complicated stroke causes mixing of bubbles into the sealing material. Therefore, in order to form the fillet shape climbing over the corner 10d with only the sealing material, a high technique is required.

In contrast, in the sealing method of this embodiment, as the molded body 30 is formed, as described above, it is easy to shape the fillet shape of the sealing material and it is possible to suppress mixing of bubbles.

Furthermore, the sealing method of this embodiment can be used for a fuel tank of an aircraft. The fuel tank of the aircraft may be formed by bonding the CFRP material to another member in the vicinity of the end surface of the CFRP material, in some cases. In this case, it is necessary to seal a portion between the CFRP material and another member in the vicinity of the end surface of the CFRP material such that the fuel in the fuel tank does not leak.

In addition, in a case where the CFRP material has an end surface intersecting with the orientation of the carbon fiber, a plurality of carbon fibers are exposed at the end surface. Therefore, in the aircraft, it is necessary to seal also the end surface of the CFRP material so that a spark does not occur at the end portion of the carbon fiber even when lightning strikes, charging, and electric leakage occur, for example.

Thus, if the sealing method of this embodiment is used for the sealing in the vicinity of the end surface of the CFRP material, it is possible to seal the end surface of the CFRP material and to seal a portion between the CFRP material and another member. Accordingly, sealing formation in the CFRP material is simple.

In the sealing method of this embodiment, a precured material is used in the molded body 30. Therefore, in the sealing in the fuel tank of the aircraft, it is possible to perform sealing using a sealing material that is already reliable as a material. Therefore, it is possible to reduce work for ensuring reliability such as guarantees and tests for the use of a new material.

Since in the sealing method of this embodiment, the exposed portion among the molded body 30 and the second sealing material 50 shaped in the fillet shape is streamlined, it is difficult to peel off the molded body 30 and the second sealing material 50 by the flow of the fuel in the fuel tank.

Second Embodiment

Hereinafter, a sealing method according to a second embodiment will be described with reference to FIGS. 13 to 17.

The sealing method of the second embodiment is different from the sealing method of the first embodiment in that the second sealing material is not applied by placing a molded body at the corner of the first component 10 over the front surface of the second component. The other points are the same as those in the first embodiment.

Figure 13:
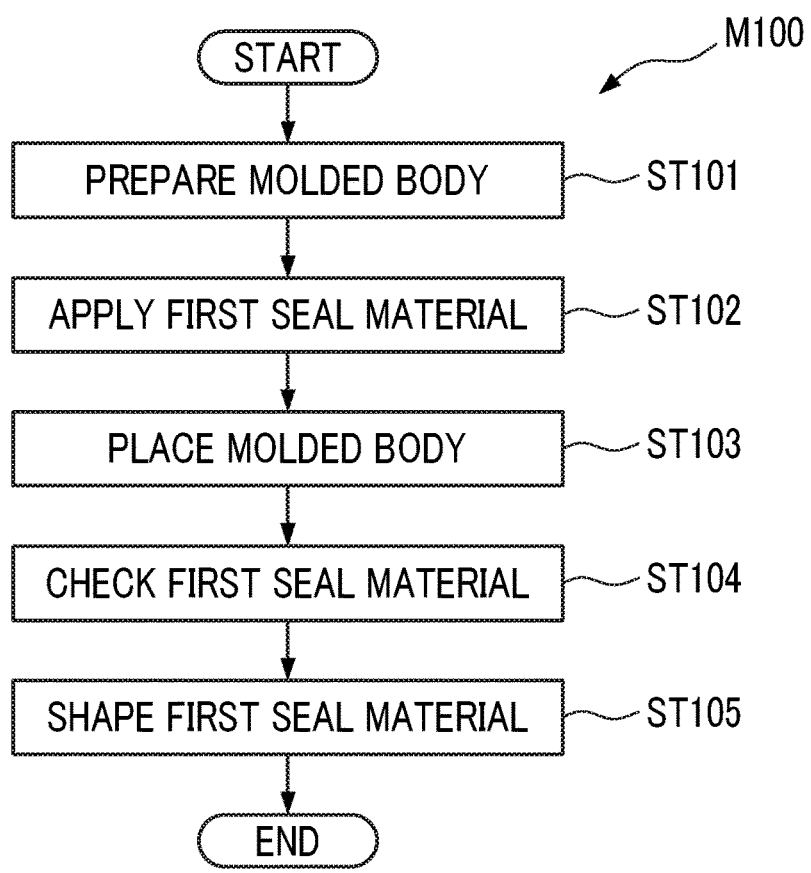
FIG. 13 is a flowchart of a sealing method in a second embodiment according to the invention.

As illustrated in FIG. 13, a sealing method M100 of this embodiment includes a step (ST101) of preparing a molded body 130, a step (ST102) of applying the first sealing material 40 to the molded body 130, a step (ST103) of placing the molded body 130, a step (ST104) of checking the first sealing material 40, and a step (ST105) of shaping the first sealing material 40.

Step of Preparing Molded Body

First, ST101 is performed. In ST101, the operator prepares the molded body 130 according to the shape of the corner 10d between the front surface 10a and the end surface 10c of the first component 10 and the shape of the end surface 10c of the first component 10.

The molded body 130 extends in the Y direction.

Figure 14:
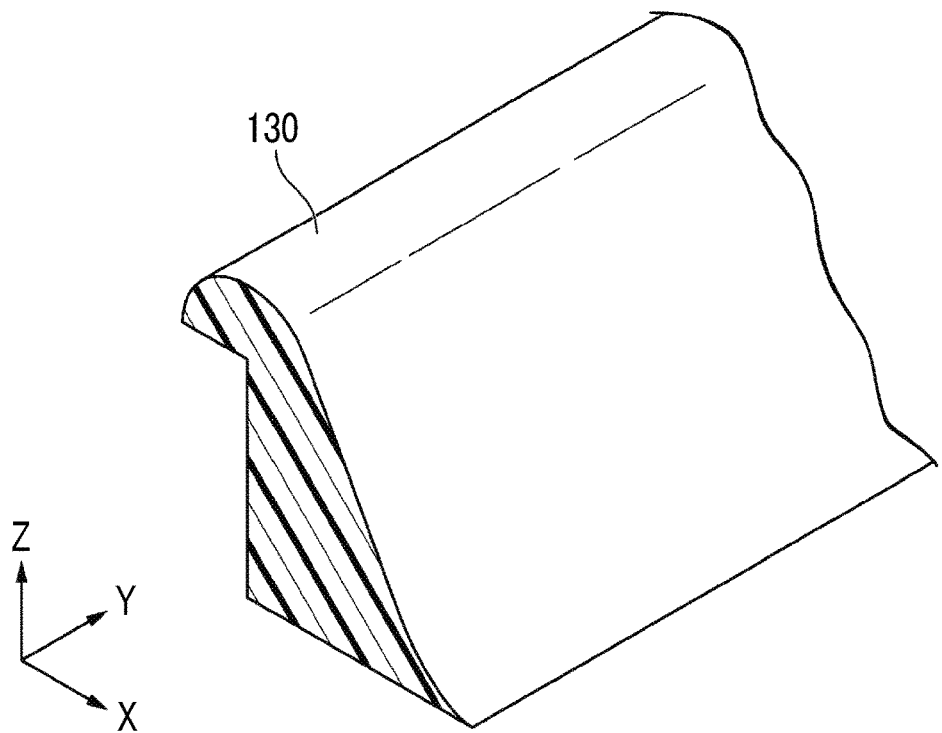
FIG. 14 is a perspective view illustrating a molded body prepared in the second embodiment according to the invention.

As illustrated in FIG. 14, the cross section of the molded body 130 in the ZX plane has a shape along the corner 10d of the first component 10, the end surface 10c of the first component 10, and the front surface 20a of the second component 20, on a side where the molded body 130 abuts on the first component 10 and the second component 20. On the exposed side, the molded body 130 has a shape covering the corner 10d and the end surface 10c of the first component 10, and a hem-spread shape (fillet shape) toward the front surface 20a of the second component 20.

In this embodiment, the molded body 130 has a contour shape in which the second sealing material 50 shaped in the fillet shape and the molded body 30 of the first embodiment are combined.

In this embodiment, the molded body 130 is formed of a substance (precured material) obtained by curing a material used for the first sealing material 40 or the second sealing material 50 of the first embodiment. The shape of the molded body 130 may be shaped before curing or may be shaped after curing.

Step of Applying First Sealing Material to Molded Body

Figure 15:
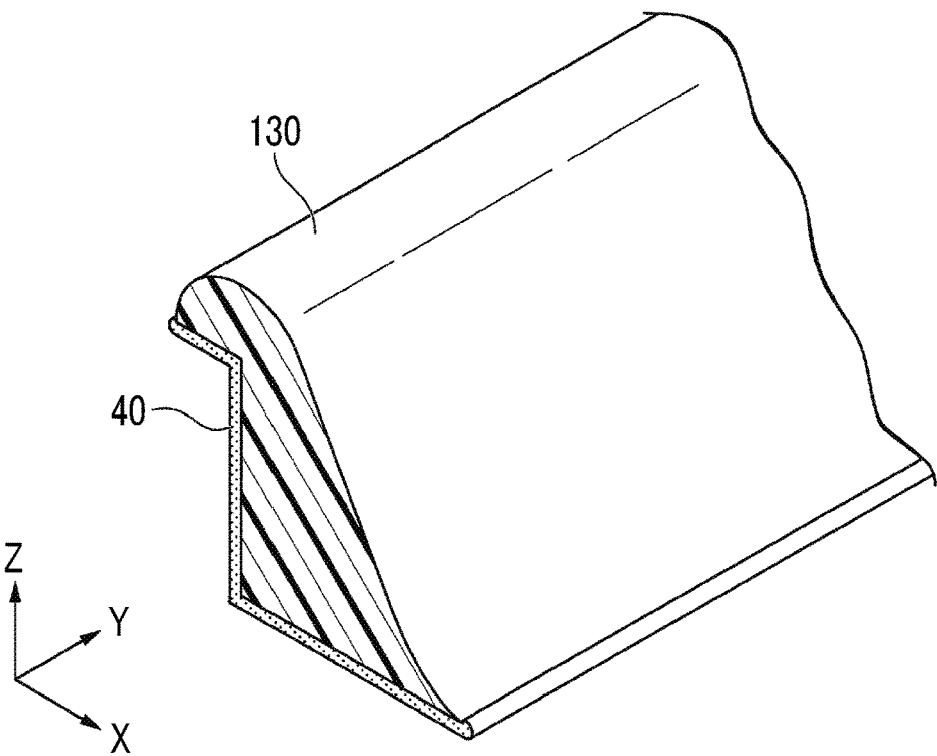
FIG. 15 is a perspective view illustrating the molded body to which a first sealing material is applied in the second embodiment according to the invention.

Following ST101, ST102 is performed. In ST102, the operator applies the first sealing material 40 to at least a part of the portion abutting on the corner 10d of the first component 10, the end surface 10c of the first component 10, and the front surface 20a of the second component 20 among the molded body 130, as illustrated in FIG. 15.

Step of Placing Molded Body

Figure 16:
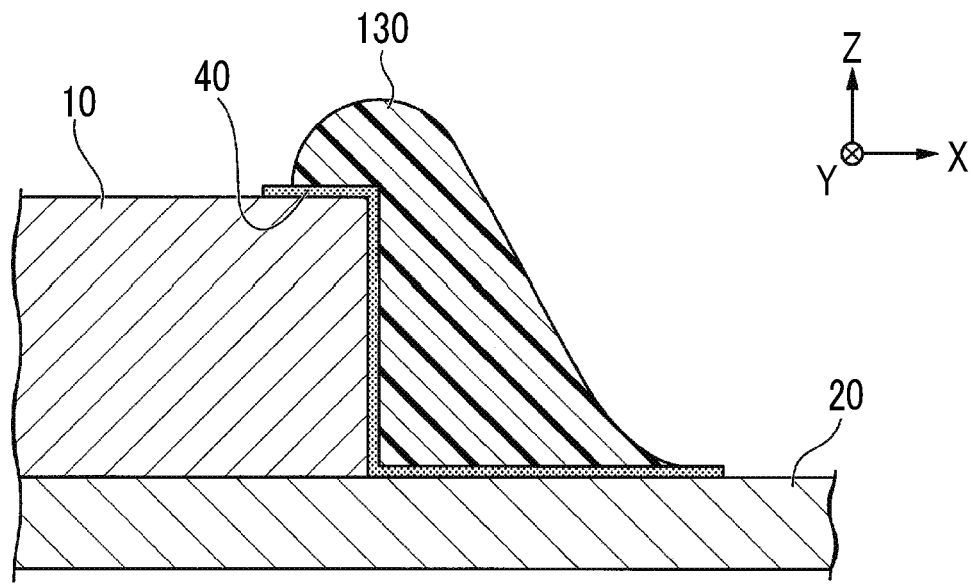
FIG. 16 is a view illustrating a step of placing the molded body in the second embodiment according to the invention.

Following ST102, ST103 is performed. In ST103, the operator places the molded body 130 on the corner 10d of the first component 10, the end surface 10c of the first component 10, and the front surface 20a of the second component 20 as illustrated in FIG. 16. In ST102, the first sealing material 40 is applied slightly more to an extent that the first sealing material 40 protrudes from the periphery of the molded body 130 at the time of placing the molded body 130.

Step of Checking First Seal

Following ST103, ST104 is performed. In ST104, the operator checks the first sealing material 40 protruding from the periphery of the molded body 130. In this embodiment, the operator checks that the first sealing material 40 protrudes from the periphery of the molded body 130 toward the front surface 10a of the first component 10 and the front surface 20a of the second component 20.

Step of Shaping First Seal

Following ST104, ST105 is performed. In ST105, the operator shapes the first sealing material 40 protruding from the periphery of the molded body 130 as illustrated in FIG. 17.

Figure 17:
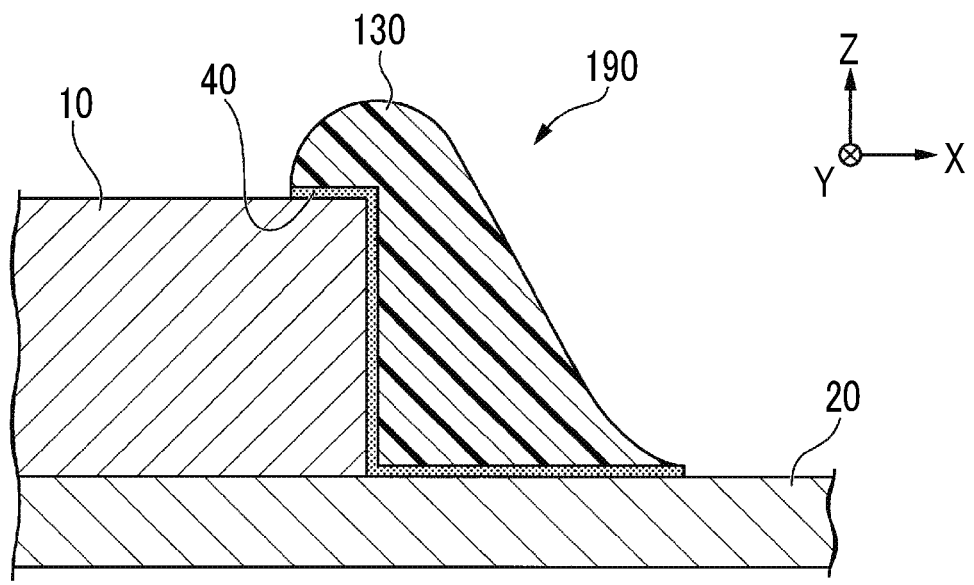
FIG. 17 is a view illustrating a step of shaping the first sealing material in the second embodiment according to the invention.

By the above-described steps, it is possible to obtain an assembly 190 having the first component 10, the second component 20, and the molded body 130 which is placed from the corner 10d of the first component 10 up to the front surface 20a of the second component 20 via the first sealing material 40, as illustrated in FIG. 17.

Action and Effect

In the sealing method of this embodiment, the molded body 130 is placed from the front surface 10a of the first component 10 up to the front surface 20a of the second component 20 via the first sealing material 40. In this manner, it is possible to seal the end surface 10c of the first component 10, and to seal a portion between the first component 10 and the second component 20. Accordingly, sealing formation in the composite material is simple.

Since in the sealing method of this embodiment, the molded body 130 with the shape maintained is placed, as at least the molded body 130 is formed, it is possible to reduce time for sealing molding and to suppress quality degradation due to mixing of bubbles. Further, since the molded body 130 with the shape maintained is placed, it is possible to keep the dimension of sealing including the molded body 130 constant.

Similar to the first embodiment, the sealing method of this embodiment can be used for a fuel tank of an aircraft. If the sealing method of this embodiment is used, it is possible to seal the end surface of the CFRP material and to seal a portion between the CFRP material and another member. Accordingly, sealing formation in the CFRP material is simple.

Further, since the step of applying the second sealing material is not essential, it is possible to implement the sealing method of this embodiment with simpler steps as compared with the first embodiment.

Modification Example

In the above-described embodiments, the molded bodies and 130 are formed of a precured material. In the modification example, the molded bodies 30 and 130 may be formed of thermoplastic resin with elasticity without being limited to the precured material. As the thermoplastic resin with elasticity, plastics such as polyethylene (PE), polypropylene (PP), and polytetrafluoroethylene (PTFE) may be used.

In the above-described first embodiment, the first sealing material 40 and the second sealing material 50 are formed of the same material. In the modification example, the first sealing material 40 and the second sealing material 50 may be formed of the different materials.

In the above-described embodiments, the molded bodies 30 and 130 are formed of a precured material obtained by curing a material used for the first sealing material 40 or the second sealing material 50.

In the modification example, the molded bodies 30 and 130 may be formed of a substance (precured material) obtained by curing a material different from a material used for the first sealing material 40 or the second sealing material 50.

In the above-described embodiments, the sealing method may be applied to any assembly.

In the modification example, the respective steps may be performed in a manufacturing method for the assemblies 90 and 190. In another modification example, the respective steps may be performed in a repairing method of the assemblies 90 and 190.

In the above-described first embodiment, the molded body 30 has a fan shape in the ZX section, but may have any shape.

In the modification example, the molded body 30 may have a shape in which the shape extending in the fillet shape toward the second component 20 is added to the fan shape in the ZX section.

In the above-described first embodiment, the second sealing material 50 is shaped by causing the shaping section TLa of the shaping tool TL to abut on the molded body 30 and the front surface 20a of the second component 20, but the shapes of the abutting surfaces of the molded body 30 and the shaping tool TL may be matched.

In the modification example, for matching the shapes of the abutting surfaces of the molded body 30 and the shaping tool TL to each other, the shaping section TLa may have a curved surface according to the curvature of the peripheral curved surface of the molded body 30, at least on a part thereof. In this case, the second sealing material 50 is shaped by causing the curved surface of the shaping section TLa to abut on the peripheral curved surface of the molded body 30.

Figure 18:
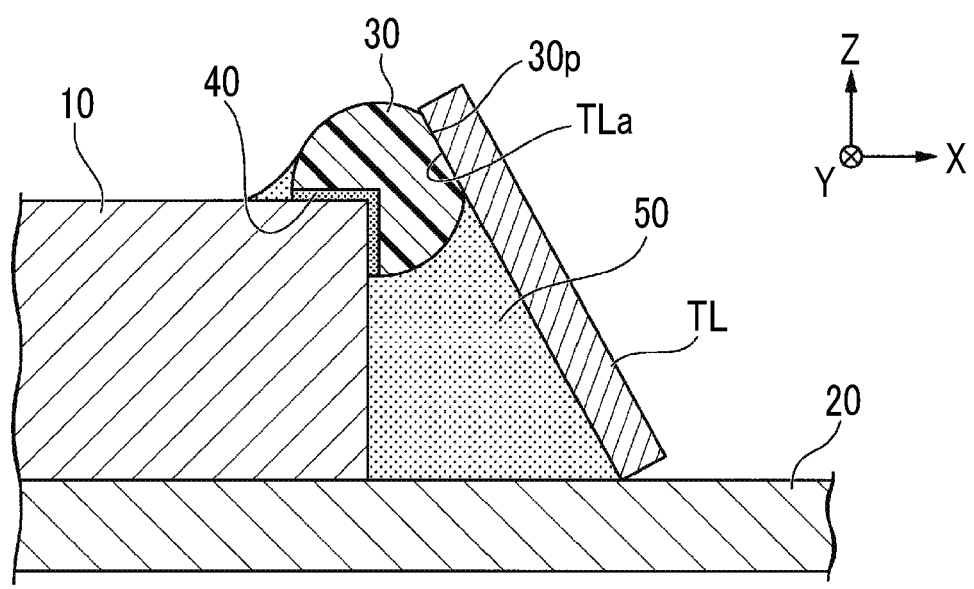
FIG. 18 is a view illustrating a step of shaping the second sealing material in a modification example of the first embodiment according to the invention.

In another modification example, for matching the shapes of the abutting surfaces of the molded body 30 and the shaping tool TL to each other, a part of the peripheral curved surface of the molded body 30 may be a flat surface 30p extending in the Y direction as illustrated in FIG. 18. In this case, the second sealing material 50 is shaped by causing the flat surface of the shaping section TLa to abut on the flat surface 30p of the molded body 30.

If the shapes of the abutting surfaces of the molded body 30 and the shaping tool TL are matched, the shaping tool TL is more stably guided, and thus shaping of sealing becomes easier.

In the above-described embodiments, the respective steps are performed by the operator. In the modification example, at least some of the respective steps may be performed by a device instead of the operator.

For example, the step of placing the molded body and the step of shaping the second sealing material may be performed by robot arms, and the step of applying the first sealing material and the step of applying the second sealing material may be performed by an application device.

The sealing methods of the above-described embodiments are applied to the composite material containing a reinforcing fiber and a resin, but it is not limited to a composite material. In the modification example, the sealing methods of the above-described embodiments may be applied to sealing of a portion between a first component and a second component such as metal or plastics. For example, the sealing methods of the above-described embodiments may be applied to sealing of a portion between metal and metal, or may be applied to sealing of a portion between plastics and plastics. Of course, the sealing methods of the above-described embodiments may be applied to sealing of a portion between metal and plastics. For example, metal may be aluminum or iron.

Some embodiments of the invention have been described, but the embodiments are presented as examples, and are not intended to limit the scope of the invention. These embodiments can be implemented in other various forms, and various omissions, replacements, and modifications can be made without departing from the gist of the invention. These embodiments and modifications thereof are included in the invention described in the claims and equivalents thereof, as included in the scope and gist of the invention.

INDUSTRIAL APPLICABILITY

According to an aspect of the invention, sealing formation in a composite material is simple.

REFERENCE SIGNS LIST

10: first component
10a: front surface
10b: rear surface
10c: end surface
10d: corner
20: second component
20a: front surface
30: molded body
30d: notch
30p: flat surface
40: first sealing material
50: second sealing material
90: assembly
130: molded body
190: assembly
M1: sealing method
M100: sealing method
TL: shaping tool
TLa: shaping section
ST01: step of preparing molded body
ST02: step of applying first sealing material
ST03: step of placing molded body
ST04: step of checking first sealing material
ST05: step of shaping first sealing material
ST06: step of applying second sealing material
ST07: step of shaping second sealing material
ST101: step of preparing molded body
ST102: step of applying first sealing material
ST103: step of placing molded body
ST104: step of checking first sealing material
ST105: step of shaping first sealing material

The invention claimed is:

1. A sealing method for sealing a portion between a rear surface of a first component which is a composite material containing a reinforcing fiber and a resin, and a front surface of a second component facing the rear surface of the first component, the sealing method comprising:
   a step of placing a molded body at a corner between a front surface and an end surface of the first component, via a first sealing material; and
   a step of applying a second sealing material from the molded body up to the front surface of the second component.

2. A sealing method for sealing a portion between a rear surface of a first component which is a composite material containing a reinforcing fiber and a resin, and a front surface of a second component facing the rear surface of the first component, the sealing method comprising:
   a step of placing a molded body from a corner between a front surface and an end surface of the first component up to the front surface of the second component, via a first sealing material.

3. The sealing method according to claim 1, wherein the molded body is a precured material.

4. The sealing method according to claim 1, further comprising:
   a step of applying the first sealing material to the molded body before the step of placing the molded body.

5. The sealing method according to claim 1, further comprising:
   a step of checking the first sealing material which protrudes from a periphery of the molded body, following the step of placing the molded body.

6. The sealing method according to claim 1, further comprising:
   a step of shaping the first sealing material which protrudes from a periphery of the molded body, following the step of placing the molded body.

7. The sealing method according to claim 1, further comprising:
   a step of shaping the second sealing material, following the step of placing the molded body.

8. The sealing method according to claim 7,
wherein the step of shaping the second sealing material is
a step of performing shaping by causing a shaping tool to abut on the molded body, and
shapes of abutting surfaces of the molded body and the shaping tool are matched.

9. An assembly comprising:
a first component which is a composite material containing a reinforcing fiber and a resin;
a second component of which a front surface is disposed to face a rear surface of the first component;
a molded body which is placed at a corner between a front surface and an end surface of the first component, via a first sealing material; and
a second sealing material applied from the molded body up to the front surface of the second component.

10. A manufacturing method for an assembly in which a portion between a rear surface of a first component which is a composite material containing a reinforcing fiber and a resin and a rear surface of a second component facing the rear surface of the first component is sealed, the manufacturing method comprising:
a step of placing a molded body at a corner between a front surface and an end surface of the first component, via a first sealing material; and
a step of applying a second sealing material from the molded body up to the front surface of the second component.

* * * * *